United States Patent [19]

Fourny

[11] 3,784,788
[45] Jan. 8, 1974

[54] ELECTRIC LIQUID BOILING APPARATUS HAVING AN ELECTRONIC TEMPERATURE SENSOR CONTROL

[75] Inventor: Denise Gisele Josette Fourny, Monte Carlo, Monaco

[73] Assignee: Belling & Co., Limited, Enfield, Middlesex, England

[22] Filed: May 4, 1972

[21] Appl. No.: 250,349

[30] Foreign Application Priority Data
May 4, 1971 France .............................. 7115967

[52] U.S. Cl. .................... 219/441, 99/281, 219/494, 219/330, 219/504, 219/516, 338/22 R
[51] Int. Cl. ............................................ F27d 11/02
[58] Field of Search .................. 219/328, 330, 441, 219/442, 449, 494, 504, 516, 522; 99/280, 281; 317/98; 338/22 R, 22 SD

[56] References Cited
UNITED STATES PATENTS

| | | | |
|---|---|---|---|
| 2,528,191 | 10/1950 | Turner | 219/441 |
| 3,026,402 | 3/1962 | Russell | 219/441 |
| 3,539,774 | 11/1970 | Thornton | 219/442 |
| 2,806,118 | 9/1957 | Peterson | 219/522 X |
| 1,804,130 | 5/1931 | Starr | 219/449 |
| 2,350,941 | 6/1944 | Stevenson | 219/441 X |
| 3,379,859 | 4/1968 | Marriott | 219/522 |
| 3,512,909 | 5/1970 | Perkins | 317/98 X |
| 3,577,209 | 5/1971 | Perkins | 317/98 |

Primary Examiner—Volodymyr Y. Mayewsky

[57] ABSTRACT

An electric liquid boiling apparatus, particularly an electric kettle, having an automatic cut-out operated by an electronic temperature sensor, e.g. a thermistor which is subjected to vapour when the liquid boils.

8 Claims, 8 Drawing Figures

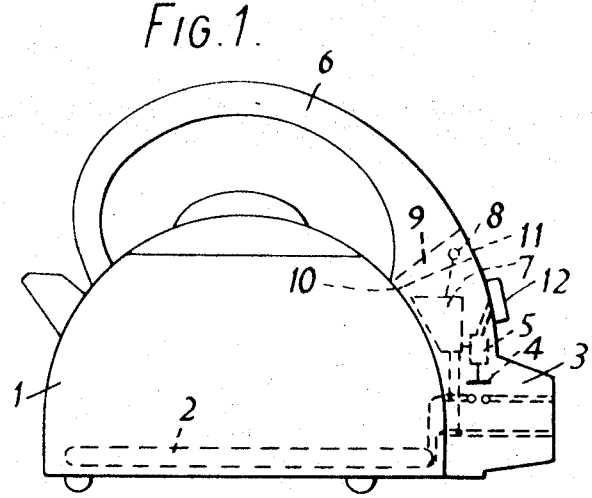
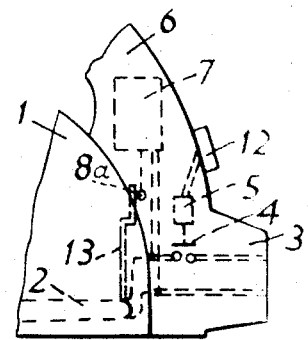
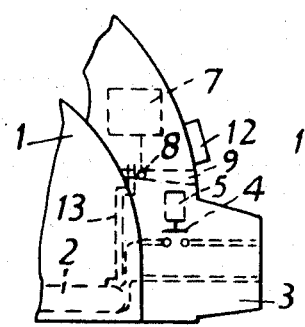
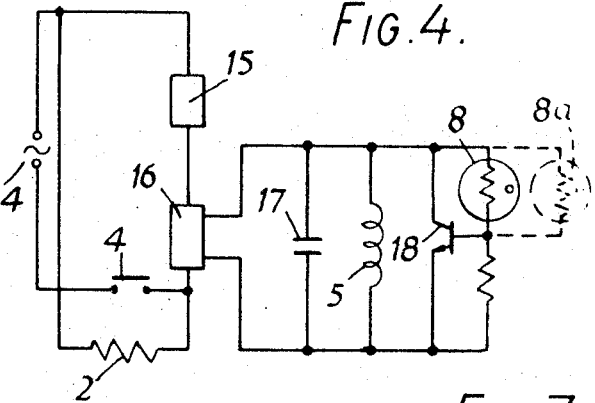
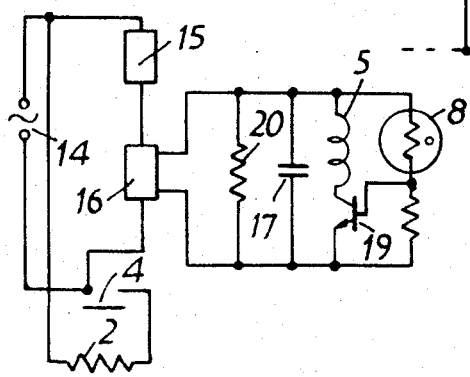
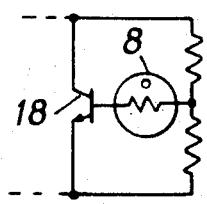
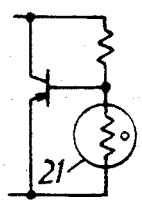
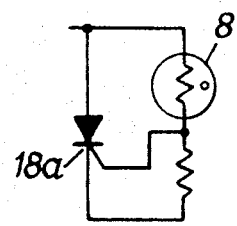

ELECTRIC LIQUID BOILING APPARATUS HAVING AN ELECTRONIC TEMPERATURE SENSOR CONTROL

The invention relates to electric apparatus for boiling liquids such as, for example, electric kettles, coffee percolators, washing machines, fat friers, etc. The invention provides, in such apparatus, electronic means responsive to temperature and effective to switch off the current supplied to the heating element, when the liquid boils and perhaps also if the heating element overheats because the apparatus is dry.

According to the invention there is provided apparatus for boiling liquids comprising a container for the liquid; an electric heating element for heating the liquid in the container; a current-controlled switch device for breaking the current supply to the heating element; an electronic temperature sensor situated in a position to be subjected to liquid vapour when liquid in the container boils, and a control circuit connecting the temperature sensor to operate the switch device to break the current supply to the heating element when the temperature sensor is heated sufficiently. As used herein "electronic temperature sensor" means a device of which an electrical parameter changes with temperature with a high temperature coefficient. Usually the parameter is resistance and what is meant in this context by "high temperature coefficient" is a temperature coefficient appreciably higher than the resistance/temperature coefficient of metals. A thermistor has a suitable temperature coefficient and a device with a temperature coefficient half as high as that of a thermistor would be acceptable. Preferably the temperature sensor is a thermistor. The temperature sensor may have a positive or a negative resistance/temperature coefficient.

The temperature sensor may be positioned in the air space above the liquid. However, a feature of the invention consists in positioning the temperature sensor in a duct or outside an opening in the container arranged so that when the liquid boils a vapour stream is ejected from the opening or through the duct, the temperature sensor being subjected to the vapour stream. This arrangement has the advantage that when boiling ceases, the temperature sensor cools more rapidly than if it were directly in the air space above the liquid. Thus, the switch device may be reset quickly for further operation.

It is often desirable to switch off the electric current to the heating element under either of two conditions — (a) when the liquid boils and (b) if the heating element should over-heat because the container is dry. The invention may be used to perform either function (a) or both functions. When both functions are to be performed a single temperature sensor may be used, this being arranged both to be subjected to vapour on boiling so as to be raised in temperature sufficiently by the vapour on boiling and also in thermal contact with the heating element so as to be raised in temperature sufficiently when the element over-heats. An alternative arrangement when both functions are to be performed is to provide two temperature sensors electrically connected in tandem so that heating of either operates the switch device, being subjected to vapour on boiling and the other sensor being in thermal contact with the heating element. The second temperature sensor may be another electronic device such as a thermistor. Alternatively the second temperature sensor may be another device such as a bimetal strip having contacts connected to operate the switch device.

In another arrangement in accordance with the invention the boil-dry cut-out is a conventional device such as a bimetal strip having its own contacts which are broken when the container boils dry or peraps being arranged to trigger a mechanical device which ejects a mains supply plug from the container.

The switch device may be a relay and the control circuit may comprise a transistor which controls the energisation of the relay and which in turn is controlled by the temperature sensor or sensors. As an alternative the switch device may be a semiconductor device such as a thyristor or triac capable of carrying the heating current and controlled by the temperature sensor or sensors either directly or through the intermediary of a transistor or thyristor.

The control circuit may act simply to cut off the switch device when the liquid has boiled, the circuit or switch device being reset subsequently by hand. Alternatively, however, the control circuit may be effective to maintain the temperature of the liquid at or slightly below the boiling point by switching off the switch device when the temperature sensor is heated and switching the switch device on again when the temperature sensor cools.

Conveniently, the control circuit derives operating current from the mains current supply for the heating element through a transformer or voltage-dropping impedance.

In a preferred embodiment of the invention the apparatus is an electric kettle for boiling water, the control circuit and switch device being included in the kettle handle. A duct in the handle communicates with the air-space above the water and includes a thermistor which controls a manually resettable relay.

The invention will further be described with reference to the accompanying drawings, of which:

FIG. 1 is a diagrammatic side elevation of an electric kettle embodying the invention;

FIG. 2 is a diagram showing part of the kettle of FIG. 1 with a modification;

FIG. 3 is a diagram showing part of the kettle of FIG. 1 with another modification;

FIG. 4 is a circuit diagram of the kettle of FIGS. 1–3;

FIG. 5 is a circuit diagram of an alternative circuit for use in accordance with the invention; and FIGS. 6, 7 and 8 are diagrams illustrating possible modifications to the control circuit.

Referring to FIG. 1 there is shown an electric kettle comprising a body 1 at the bottom of which is an electric heating element 2. Electric current for the heating element is derived from a socket 3 through contacts 4 of a relay 5. The handle 6 of the kettle houses the relay 5 and also a control circuit 7 therefor. The control circuit is controlled by a thermistor 8 which is situated in a duct 9 in the handle. The duct 9 communicates at 10 with the air-space above the water and at 11 with atmosphere.

In use, the kettle is filled with water and connected by a plug and lead (not shown) to the mains supply. A push-button 12 is depressed and this closes the contacts 4 of relay 5 directly. The relay is energised and holds contacts 4 closed. When the water boils steam passes through duct 9 and heats thermistor 8 to a temperature of about 100°C. This is sufficient to cause the control circuit 7 to de-energise relay 5, thus causing the contacts 4 to open and cut off the current supply to the heating element.

FIG. 2 shows a modification of the kettle of FIG. 1. The kettle of FIG. 2 is the same as that of FIG. 1 except that another thermistor 8a has been added. Thermistor 8 is not shown in FIG. 2 although it is present. Thermistor 8a is effective instead to cut off the current supply if the heating element over-heats and is mounted on a beryllium-copper strip 13 which is soldered to the heating element 2. The strip 13 conducts heat from the heating element to the thermistor and maintains the thermistor at substantially the temperature of the heating element. The circuit is such that if the temperature of the heating element rises significantly above the boiling point of water to 125°C, say, then relay 5 is de-energised to open contacts 4. It will be seen that thermistors 8 and 8a are effectively connected in parallel to de-energise the relay if either is heated sufficiently. Thus, this embodiment provides cut-off of the heating element current if the water boils or if the heating element over-heats.

Another way of performing both functions is illustrated in FIG. 3. In this arrangement a single thermistor 8 is mounted on a beryllium-copper strip 13 as in FIG. 2 and is also situated in a duct 9 communicating with the air-space above the water. Thus the thermistor will be heated sufficiently to de-energise the relay if the water boils or if the heating element over-heats.

FIG. 4 is the circuit diagram for any of the kettles of FIGS. 1 to 3. The alternating current supply is shown at 14. Heating element 2 is connected across the supply when relay contacts 4 are closed, as is a series combination of a voltage-dropping impedance 15 and a full-wave bridge rectifier 16. The output from rectifier 16 is smoothed by a capacitor 17 and applied to the relay coil 5. It will be seen that when contacts 4 are closed by depression of push-button 12 (FIG. 1) the coil 5 is energised and holds contacts 4 closed.

A transistor 18 is connected across coil 5 and is normally non-conducting. However, thermistor 8, which in this embodiment has a negative resistance/temperature coefficient, is connected in the base-emitter path of the transistor. When the temperature of thermistor 8 rises sufficiently its resistance drops to a level which allows transistor 18 to conduct and thereby short-circuit relay 5. The relay is thus de-energised and the contacts 4 open to cut off the current to the heating element.

In the arrangement described above in which two thermistors are provided, a suitable method of connecting the second thermistor is in parallel with the first, as indicated at 8a in FIG. 4.

FIG. 5 shows an alternative circuit diagram for kettles such as those of FIGS. 1 to 3. Instead of a transistor in parallel with coil 5 there is provided a transistor 19 in series with it. The transistor is normally conducting and is cut off by sufficient increase in the resistance of thermistor 8 which has a positive resistance/temperature characteristic and is connected to the base of the transistor. A resistor 20 is provided to act as a load for the rectifier 16 when the transistor is cut off. For the sake of illustration FIG. 5 shows an arrangement in which energisation of the control circuit does not depend upon closure of contacts 4.

FIG. 6 shows an alternative disposition for the thermistor 8 in relation to the transistor 18 of FIG. 4.

FIG. 7 shows that the transistor 18 can be p.n.p. instead of n.p.n. and shows a suitable arrangement for a thermistor 21 with a positive resistance/temperature characteristic.

FIG. 8 shows a further modification where, instead of a transistor 18 across coil 5 there is provided a thyristor 18a, the trigger electrode of which is connected to the thermistor 8 so that the thyristor is triggered to conduct when the temperature of the thermistor reaches a predetermined level.

The invention is not restricted to the details of the embodiments described above with reference to the drawings. For example, instead of relay 5 and contact 4 there may be provided a semiconductor trigger arrangement such as a thyristor; a thyristor pair or a triac capable of taking the current for the heating element. This device would be rendered normally conductive by operation of a manual push button and would be cut off by sufficient heating of thermistor 8 connected directly or by way of a transistor to the trigger electrode of the semi-conductor trigger arrangement.

The rectifier 16 may be a half-wave rectifier and capacitor 17 is optional, although it is preferably provided if the rectifier is a half wave rectifier.

The temperature at which cut-off takes place is adjustable by variation of the circuit parameters. A variable resistor may be included in the circuit to allow the temperature to be set at will.

The temperature sensor need not be a thermistor but may be, for example, a semiconductor diode or perhaps a transistor.

In the above described embodiment in which there are both thermistors 8 and 8a provided, these thermistors may be electrically identical. This is possible in spite of the fact that they should operate under different circumstances because of the difference in heat flow. Thermistor 8 which is subjected to the vapour is heated and cooled much more quickly than thermistor 8a. However, if necessary the thermistors may be different electrically.

The claims defining the invention are as follows:

1. In an apparatus for boiling liquid comprising a container for the liquid, said container having an opening therein through which hot liquid vapor is ejected when the liquid boils, an electric heating element in the container for heating the liquid therein and means for carrying electric current to said heating element, the improvement comprising a current-controlled switch device in series with said current carrying means; a control circuit having an input and an output, said output being connected to the current controlled switch device; and an electronic temperature sensor means having a high temperature coefficient positioned so as to be subjected to said ejected hot liquid vapor when the liquid in the container boils and being electrically connected to said input of said control circuit, whereby when the liquid boils, the electronic temperature sensor is heated and the control circuit operates the current-controlled switch device to cut off the heating current for the heating element.

2. Apparatus as claimed in claim 1 wherein the temperature sensor means is a thermistor.

3. Apparatus as claimed in claim 1 wherein the temperature sensor means is situated outside said opening adjacent thereto.

4. Apparatus as claimed in claim 1 including a thermally conductive metal strip in thermal contact with said heating element and said electronic temperature sensor means, whereby said switch device is operative to break the current supply to the heating element both when the liquid boils and when the heating element overheats.

5. Apparatus as claimed in claim 1 including a second electronic temperature sensor means, said second sensor means being in thermal contact with said heating element, the two temperature sensor means being electrically connected in parallel so that heating of either operates the switch device, whereby said switch device is operative to break the current supply to the heating element both when the liquid boils and when the heating element overheats.

6. Apparatus as claimed in claim 1 wherein the switch device is an electromechanical relay which is manually resettable.

7. Apparatus as claimed in claim 6 wherein the control circuit comprises a transistor having an emitter-collector path connected to control the energization of the relay and a base emitter path connected to the said input to be controlled by said temperature sensor means.

8. Apparatus as claimed in claim 1 wherein said container is a kettle for boiling water, said kettle including a handle, the control circuit and switch device being included in said handle, a duct in the handle communicating with said opening and with the air-space above the water, said duct having the temperature sensor means positioned therein.

* * * * *